United States Patent [19]

Weissel et al.

[11] 3,923,695

[45] Dec. 2, 1975

[54] CATALYST FOR MANUFACTURING HIGHLY PURIFIED 2-HYDROXY-DIPHENYL CATALYST AND METHOD OF PREPARING CATALYST

[75] Inventors: Oskar Weissel, Krefeld-Bockum; Josef Metten, Krefeld; Hans Helmut Schwarz, Krefeld-Bockum; Horst Koller; Peter Tacke, both of Krefeld, all of Germany

[73] Assignee: Bayer Aktiengesellschaft, Germany

[22] Filed: Feb. 13, 1974

[21] Appl. No.: 442,156

Related U.S. Application Data

[63] Continuation of Ser. No. 289,119, Sept. 14, 1972, abandoned, which is a continuation-in-part of Ser. No. 184,872, Sept. 29, 1971, abandoned.

[30] Foreign Application Priority Data

Oct. 10, 1970   Germany............................ 2049809
Jan. 20, 1971   Germany............................ 2102476

[52] U.S. Cl................ 252/465; 252/466 J; 260/620

[51] Int. Cl. ......................... B01j 11/06; B01j 11/22
[58] Field of Search..................... 252/465; 260/620

[56] References Cited

FOREIGN PATENTS OR APPLICATIONS 1,108,221   6/1961   Germany ........................... 252/465

*Primary Examiner*—W. J. Shine
*Attorney, Agent, or Firm*—Connolly and Hutz

[57] ABSTRACT

Manufacture of highly-purfied 2-hydroxydiphenyl, wherein compounds or compound mixtures, which consist of wholly and/or partially hydrogenated 2-hydroxydiphenyl, are dehydrogenated in the vapour phase with the use of dehydrogenation catalysts containing the elements nickel, chromium, aluminium, copper and alkali metal sulphate and/or alkali metal carbonate, and wherein the resulting product mixture thus obtained is subjected to fractional distillation and the distillation residue is subsequently crystallised.

7 Claims, 1 Drawing Figure

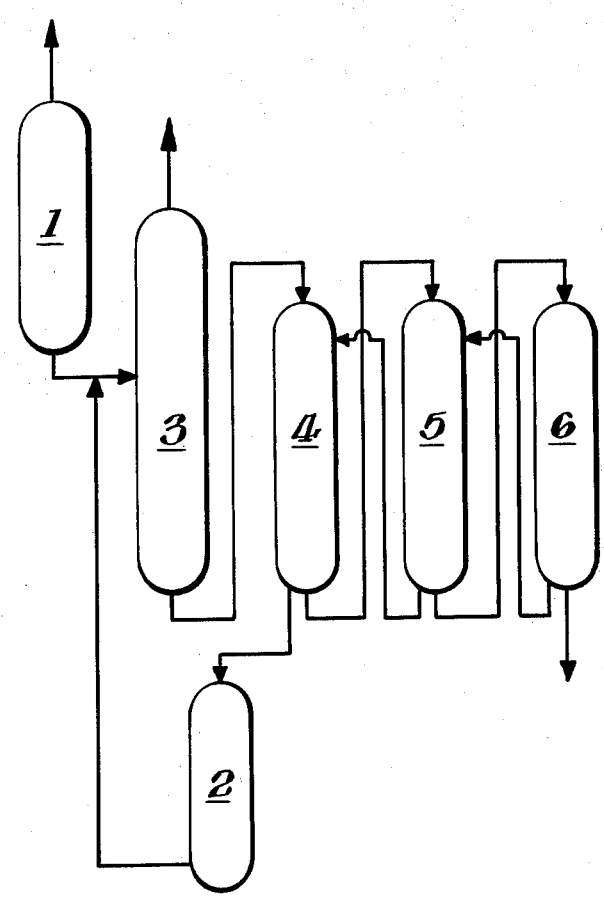

CATALYST FOR MANUFACTURING HIGHLY PURIFIED 2-HYDROXY-DIPHENYL CATALYST AND METHOD OF PREPARING CATALYST

CROSS - REFERENCE TO RELATED APPLICATION

This application is a continuation of application Ser. No. 289,119 filed Sept. 14, 1972 and now abandoned which, in turn, is a continuation-in-part of application Ser. No. 184,872 filed Sept. 29, 1971 and now abandoned.

The present invention relates to a process for the manufacture of highly-purified 2-hydroxydiphenyl from dimeric condensation products of cyclohexanone and/or their hydrogenation and partial dehydrogenation products, hereinafter, including the claims, referred to as "wholly and/or partially hydrogenated 2-hydroxydiphenyl", said process comprising dehydrogenation of these compounds or mixtures of these compounds with the use of a dehydrogenation catalyst containing nickel, chromium, aluminum, copper and alkali metal sulphate and/or carbonate and fractional distillation of the resulting product mixture and subsequently crystallisation of the distillation residue.

o-Hydroxydiphenyl is of world-wide technical importance as a preservative for citrus fruits, as a carrier for dyestuffs, and as an intermediate product.

Hitherto, o-hydroxydiphenyl has been obtained industrially as a by-product in the synthesis of phenol under pressure from chlorobenzene. To purify this technical o-hydroxydiphenyl, the product is subjected to a catalytic oxidation to remove naphthols, and subsequently to a fractional distillation.

Since now the synthesis of phenol under pressure is in the meantime being replaced, for cost reasons, by the production of phenol by the cumene process, the development of a new process for the manufacture of o-hydroxydiphenyl, with new purification steps, has become necessary.

According to German Patent Specification 1,108,221, 2-hydroxydiphenyl can be obtained by dehydrogenation of cyclohexylidenecyclohexanone on a nickel catalyst which has been deposited on chromium oxide and/or aluminium oxide, has been treated with carbon dioxide, and additionally contains additions of alkali oxides, copper or silver.

It was found, however, that the activity of such a nickel catalyst declines after a short reaction time and that alongside 2-hydroxydiphenyl, 2-cyclohexylphenol is increasingly produced, which interferes with the industrial use of the catalyst, particularly since its activity can only be raised again for a short time by burning off with air and subsequent reduction.

A further disadvantage of the dehydrogenation process described in the Patent Specification is that in order to supress dehydration processes which lead to the formation of diphenyl, about 15 mol % of water must be added, which results in a partial hydrolytic decomposition of the cyclohexylidenecyclohexanone.

In order to avoid these disadvantages existing in the manufacture of hydroxydiphenyl in the case of the catalytic dehydrogenation of compounds and/or compound mixtures which consist of wholly and/or partially hydrogenated 2-hydroxydiphenyl, the present invention relates to a process for the manufacture of 2-hydroxydiphenyl with the use of dehydrogenation catalysts of improved properties, containing nickel, chromium, aluminium, copper and alkali metal sulphate and/or alkali metal carbonate. In the manufacture of this catalyst a catalyst base composition is used containing nickel, chromium, aluminium and copper, which can be obtained according to known methods, for example by conjoint precipitation from an aqueous solution containing nickel nitrate, chromium nitrate, aluminium nitrate and copper nitrate, by means of sodium hydroxide solution, for example in accordance with German Patent Specification No. 889,591. The chromium compound can here, for example, also be employed in the 6-valent form (see, for example, Handbuch der Katalyse (Handbook of Catalysis), volume VII, 1st half, page 674, or Houben-Weyl, volume 4/2, page 179), and as the precipitant, ammonia, alkali carbonates or alkali bicarbonates can, for example, also be used instead of sodium hydroxide solution (see Houben-Weyl, volume 4/2, page 137 and thereafter; Handbuch der Katalyse (Handbook of Catalysis), volume V, Het.Cat.II, page 412 and thereafter). Depending on the precipitation conditions, that is to say depending on the precipitant used, the pH value of the solution and the nature of the chromium compound employed, the nickel here for example precipitates as the hydroxide, as the basic carbonate (see, for example, Gmelin, 8th Edition, part B, Issue 3, Syst. No. 57(1966), page 846-853 ), or as ammonium nickel chromate (see Gmelin, 8th Edition, part B, Issue 3, Syst.No. 57, pages 1215–1216). A possible variant for the manufacture of the catalyst base composition is, for example, also to precipitate a carbonate-hydroxide mixture with alkali carbonate solution from a nickel salt, aluminium salt and copper salt solution, and to react this, after washing, with ammonium bichromate at elevated temperature.

This catalyst base composition is impregnated before or after shaping, appropriately before shaping, with alkali metal sulphate or alkali metal carbonate in such a way that the quantity ratios of the alkali metals to the metals nickel, chromium, aluminium and copper are 0.65 – 3.4, preferably 0.95 – 2.8, to 40 – 60, to 6.8 – 17.1 to 1.6 – 8.0, to 0.05 – 1.0.

It is true that nickel-chromium-copper catalysts containing alkali metal sulphate have already been manufactured for other dehydrogenation processes, for example for the manufacture of phenol from cyclohexanone and cyclohexanol (U.S. Patent 2,640,084, as well as Ind. Eng. Chem. 44, 1696 (1952)), but apart from the fact that these catalysts already differ in their overall composition and structure from the catalysts described above, it is adequately known from practical experience with catalysts that the transfer of very special conditions of one process to a different process is not directly possible.

Thus, in the present case, two aspects manifested themselves: "phenol catalysts" of the type mentioned are totally unsuitable for the manufacture of hydroxydiphenyl (see Example 8). Alkali metal salt additions to other nickel-chromium-copper catalysts or nickel-chromium-aluminium-copper catalysts by themselves do not yet effect any significant improvement in their mode of action (for example catalyst A in Example 1 and 4, or catalyst C in Example 2 and 5).

In addition to the overall composition of the catalysts, the nature and type of catalyst shaping and catalyst reduction are of equally decisive influence on the selectivity and working life of the catalyst.

The shaping of the catalyst is appropriately carried out according to the invention on tablet presses before or after impregnation, preferably after impregnation in such a way that the bulk density of the catalyst tablets is between 0.8 and 1.6 g/ml, especially between 0.9 and 1.4 g/ml. Tabletting may be carried out once or several times. In the case of tablet sizes of diameter up to ≈3 mm, tabletting once in general suffices; for larger tablets, double tabletting is advisable.

The reduction of the catalyst should take place in such a way that the content of metallic nickel in the finished catalyst is between 10 and 45 % by weight, preferably between 35 and 42 % by weight.

Particularly active catalysts of long life are obtained if the reduction is carried out in two stages, the first stage of the reduction being carried out with about half to twice the equivalent amount of hydrogen calculated for the reduction of the nickel compounds to metallic nickel and, where relevant, of the chromium(VI) compounds to compounds of trivalent chromium, over the course of one to four hours, whilst the second stage of the reduction is carried out, preferably, after a time interval of at least 1 week, with about two to ten times the equivalent amount of hydrogen calculated for the reduction of the nickel compounds of the catalyst to metallic nickel, over the same length of time, the temperatures in each case being between 350° and 420°C, preferably between 370° and 390°C.

If the catalyst composition is tabletted twice, the first stage of the reduction should be carried out after the first tabletting and the second stage after the second tabletting. The first stage of the reduction can in this case be followed appropriately by an immunisation of the catalyst. For this purpose, either ammonia and carbon dioxide in succession, or very dilute air is passed over the catalyst in the usual manner.

The reduction can be followed by an ageing of the catalyst, for example with carbon dioxide at 100°C or, for example, with very dilute air at room temperature.

However it also suffices largely to displace the hydrogen adsorbed on the catalyst by means of nitrogen or carbon dioxide.

The catalyst thus manufactured is particularly suitable for the synthesis of 2-hydroxydiphenyl by catalytic dehydrogenation of compounds or compound mixtures which consist of wholly and/or partially hydrogenated 2-hydroxydiphenyl.

The catalyst to be used according to the invention is distinguished by the following advantages over known catalysts, for example, the catalyst of German Patent Specification 1.108.221.

The working life of the new catalyst is greatly increased. The catalyst works even in the absence of water and even after a prolonged operating time very selectively in the sense of a dehydrogenation. The dehydrating influence is diminished to a large extent.

The new catalyst can be regenerated easily, in particular by simple rinsing with a solvent at somewhat elevated temperature, for example with phenol at 170°C.

This considerable improvement in the mode of action of the catalyst is in particular attributable to the combined influence of the addition of alkali metal salt, to the type of reduction conditions used, and to the controlled type of catalyst shaping. The type and extent of this influence were surprising and unforeseeable.

Suitable starting products for the use, according to the invention, of the catalyst for the catalyst for the manufacture of 2-hydroxydiphenyl are, for example: 2-cyclohexylidencyclohexanone, 2-cyclohexenylcyclohexanone, 2-cyclohexylcyclohexanone, 2-cyclohexylcyclohexanol, 2-cyclohexylphenol, 2-phenylcyclohexanone and 2-phenylcyclohexanol.

The compounds mentioned are easily accessible. Thus, for example, 2-cyclohexylidenecyclohexanone and 2-cyclohexenylcyclohexanone are obtained by condensation of cyclohexanone in the presence of acid or basic catalysts, according to known methods. These two compounds are furthermore produced, alongside 2-cyclohexylcyclohexanone, 2-cyclohexylcyclohexanol and others, as by-products in the catalytic dehydrogeneation of cyclohexanol. They can easily be separated from the dehydrogenation mixture by distillation and be used as a mixture for the manufacture of 2-hydroxydiphenyl.

Cyclohexylphenol is obtained according to known methods by catalytic alkylation of phenol; 2-cyclohexylphenol furthermore arises, alongside 2-phenylcyclohexanone and 2-phenylcyclohexanol, 2-cyclohexylcyclohexanol and 2-cyclohexylcyclohexanone, as a by-product in the synthesis of 2-hydroxydiphenyl. All the compounds mentioned can be recycled to the process.

In doing so, they are passed over the catalyst, individually or mixed with one another, in the vapour form at temperatures of 300° to 400°C, especially of 320° to 350°C, under normal pressure or under reduced pressure.

If the catalyst is thus subjected to about 0.2 – about 0.4 g of starting product per ml of catalyst and per hour at normal pressure the suitable starting compounds for the manufacture of 2-hydroxydiphenyl for example yield, alongside about 88% by weight of 2-hydroxydiphenyl, about 3 to 5 % by weight of the abovementioned compounds which can be re-used, so that the catalyst selectivity is over 90 %. Under the production conditions, the proportion of hydroxydiphenyl in most cases does not drop by more than 3–5% over the course of 1000 hours, with a corresponding increase in the re-utilisable constituents. Under working conditions in which the evaporation of the starting product is effected in the upper part of the oven itself, the drop in activity naturally occurs somewhat more rapidly as a result of increased deposition of resinous compounds on the catalyst.

When the proportion of hydroxydiphenyl has dropped to 60–70%, it is advisable to regenerate the catalyst by rinsing with a solvent. This is preferably done with solvents which are inert to the catalyst under the rinsing conditions and which boil above about 130°C, the catalyst temperature being set at least about 10°C below the boiling point of the solvent. The rinsing can for example be carried out by pumping the solvent continuously through the oven from above, or, for example, by repeatedly in succession filling the oven discontinuously with fresh solvent each time. Suitable solvents are, for example, xylene, cyclohexanol, phenol, diphenyl ether and dimeric condensation products of cyclohexanone.

Regeneration of this nature can, if necessary, be repeated if the activity of the catalyst drops again.

After rinsing, the catalyst is heated to the operating temperpature in a stream of nitrogen, and is then again ready to use.

Some uses of 2-hydroxydiphenyl, in particular is utilization as a preservative, in foodstuffs, require the manufacture of a very pure end product.

If a dehydrogenation catalyst prepared in this way and containing nickel, chromium, aluminium, copper and alkali metal sulphate and/or carbonate is used for the catalytic dehydrogenation for example of 2-cyclohexenylcyclohexanone (dianone), of 2-cyclohexylidenecyclohexanone, of 2-cyclohexylphenol and/or of 2-phenylcyclohexanone in the gas phase, the resulting product mixture contains, in addition to 2-hydroxydiphenyl, byproducts, in particular, phenol, diphenyl, diphenyleneoxide and 2-cyclohexylphenol. The purification process mentioned at the start, which is based on crude 2-hydroxydiphenyl obtained as a by-product in the synthesis of phenol under pressure from chlorobenzene and which comprises catalytic oxidation to remove naphthols followed by fractional distillation, does not produce satisfactory results with a crude 2-hydroxydiphenyl obtained according to the dehydrogenation process of the invention due to the differences between the resulting by-products.

A fractional distillation alone does not achieve the aim because the vapour pressure curves of some by-products, for example of diphenylene oxide and o-cyclohexylphenol, run almost identical to the vapour pressure curve of 2-hydroxydiphenyl. Additionally, diphenylene oxide and 2-hydroxydiphenyl give azeotropically boiling mixtures. Removal of these impurities by fractional distillation alone is therefore not possible in an economical process.

This example shows that using purification process of fractional distillation, hitherto employed, the economically profitable large-scale industrial production of extremely pure 2-hydroxydiphenyl, with less than 1 % of impurities, from the product mixtures obtained by catalytic dehydrogenation of compounds or compound mixtures which consist of wholly and/or partially hydrogenated 2-hydroxydiphenyl is not possible.

An examination of whether, and to what extent, pure 2-hydroxydiphenyl can be isolated by crystallisation from these product mixtures showed that on recrystallisation from aliphatic or aromatic hydrocarbons the bulk of the 2-hydroxydiphenyl remains in the mother liquors and 2-hydroxydiphenyl of sufficient purity cannot be obtained as a crystalline product. Thus, for example, the recrystallisation of 500 g of a dehydrogenation mixture containing 84 % by weight of 2-hydroxydiphenyl and 3.5 % by weight of diphenyl from 200 ml of petroleum ether yields 327 g of crystals wherein the content of 2-hydroxydiphenyl is only 87 % by weight and the content of diphenyl is 3.6 % by weight. On repeating the recrystallisation several times, 258 g of crystals containing 90 % by weight of 2-hydroxydiphenyl and 3.7 % by weight of diphenyl are first obtained, followed by 206 g of crystals containing 95.6 % by weight of 2-hydroxydiphenyl and 3.4 % by weight of diphenyl, a further 190 g of crystals containing 96.3 % by weight of 2-hydroxydiphenyl and 3.6 % by weight of diphenyl, and thereafter 177 g of crystals containing 96.8 % by weight of 2-hydroxydiphenyl and 3.1 % by weight of diphenyl.

This shows that repeated recrystallisation alone, even with large losses in yield, also does not permit pure o-hydroxydiphenyl to be obtained. It has now been found that the recovery of very pure 2-hydroxydiphenyl from the product mixtures, as are obtained in accordance with the invention in the catalytic dehydrogenation of compounds or compound mixtures, which consist of wholly and or partially hydrogenated 2-hydroxydiphenyl, is successful if these product mixtures are subjected to fractional distillation and the distillation residue is subsequently crystallised.

The subject matter of the present invention is thus a process for the manufacture of highly-purified 2-hydroxydiphenyl, wherein compounds or compound mixtures, which consist of wholly and/or partially hydrogenated 2-hydroxydiphenyl, are dehydrogenated in the vapour phase with the use of dehydrogenation catalysts containing the elements nickel, chromium, aluminium, copper and alkali metal sulphate and/or alkali metal carbonate, and wherein the resulting product mixture thus obtained is subjected to fractional distillation and the distillation residue is subsequently crystallised.

The process of the invention thus provides especially using a dehydrogenation catalyst containing the elements nickel, chromium, aluminium copper and alkali metal sulphate and/or alkali metal carbonate, the weight ratio between the named elements in said catalyst being 40 – 60 to 6.8 – 17.1 to 1.6 – 8.0 to 0.05 – 1.0 to 0.65 – 3.4 and the content of metallic nickel being 10 to 45 % by weight, preferably between 35 and 42 % by weight.

The process of the invention moreover provides using a dehydrogenation catalyst whose manufacture comprises:

a. manufacturing in a manner known per se a catalyst composition containing the elements nickel, chromium, aluminium and copper as compounds, preferably as carbonates and/or chromates and/or hydroxides, in such a way that the weight ratio between the nickel, chromium, aluminium and copper compounds on the basis of the weight of their metals is 40 – 60 to 6.8 – 17.1 to 1.6 – 8.0 to 0.05 – 1.0;

b. impregnating onto this catalyst base composition at least one alkali metal sulphate and/or alkali metal carbonate either before or after the steps (c) or (e) to give a weight ratio between the alkali metal compound or compounds and the nickel compound and/or the nickel metal on the basis of the weight of their metals of 0.65 – 3.4 to 40 – 60, preferably of 0.95 – 2.8 to 40 – 60;

c. shaping the catalyst composition into mouldings having a bulk density of 0.8 – 1.6 g/ml; preferably of 0.9 to 1.4 g/ml; then d. reducing the resulting catalyst mouldings at temperatures between 350° and 420°C within about 1 to 4 hours with about half to twice the equivalent amount of hydrogen calculated for the reduction of the nickel compounds to metallic nickel and of any chromium (VI) compounds present to compounds of trivalent chromium; and, preferably after not less than one week, e. subsequently further reducing the mouldings within the above-mentioned temperature range over the course of one to 4 hours with two to ten times the equivalent amount of hydrogen calculated for the reduction of nickel compounds present to metallic nickel, until a content of metallic nickel in the composition of 10 – 45 % by weight, preferably 35 – 42 % by weight, is reached.

During the fractional distillation of the resulting product mixture, the lower-boiling components, in particular diphenyl, are distilled off at the head of the column until the diphenyl content in the product in the sump of the column has fallen to below 0.05 % by weight and the contents of diphenylene oxide and o-cyclohexylphenol have each fallen to below 20 % by weight. The amounts of diphenylene oxide, 2-cyclohexylphenol and further by products, still present in small amounts, should in total be not more than 25 % by weight, and the content of 2-hydroxydiphenyl in the sump should be not less than 75 % by weight.

A crystallisation of the crude product which has been pre-purified by distillation can be carried out in various ways, for example by the use of aliphatic and aromatic hydrocarbons as solvents.

However, a crystallisation from the melt has proved particularly effective and economical. Industrially, this purification process is appropriately carried out in tube-bundle crystallisation apparatuses, and it is advantageous to arrange several crystallisation stages in series. Here, the mother liquor of each crystallisation stage is recycled to the preceding stage, whilst the crystals are passed to the next stage.

This type of crystallisation from the melt can also be carried out in other apparatuses than tube-bundle crystallisation apparatuses. The number of crystallisation stages is optional and is primarily decided by economic considerations. In principle, a pure product can be obtained in one crystallisation stage but only a small amount of pure 2-hydroxydiphenyl is obtained thereby if starting from a crude product in which the proportion of a 2-hydroxyphenyl is approx. 75 % by weight. 2-Hydroxydiphenyl can also be obtained by crystallisation in counter-current crystallisation apparatuses, such as are described, for example, in the book "Fractional Solidification" by Zief and Wilcox, in the chapter "Column Crystallisation", page 343. The type of crystallisation primarily depends on economic considerations. The process of tube-bundle crystallisation apparatuses, described in more detail below, represents a particularly economical embodiment.

The crystallisation in the tube-bundle apparatus is carried out by introducing the fused substance mixture into the tube-bundle apparatus and cooling from the crystallisation point of the melt slowly to a few degrees C above the eutectic point of the melt. The outlet valve is then opened, whereupon eutectic mixture first issues. On slowly heating the product, further, initially still contaminated, material runs out of the tube-bundle apparatus, until finally, in the last fractions, a 2-hydroxydiphenyl which is free of by-products issues.

In an embodiment of the crystallisation which is particularly appropriate when purifying o-hydroxydiphenyl the sump product of the fractional distillation is purified in three stages in tube-bundle crystallisation apparatuses. Here, the mother liquor of each crystallisation stage is recycled to the preceding stage and the crystals are passed to the next stage. The mother liquor of the first crystallisation stage is subjected to a second dehydrogenation in order also to convert compounds such as o-cyclohexylphenol and o-phenylcyclohexanone, which are enriched in the mother liquor, into o-hydroxydiphenyl. o-Hydroxydiphenyl of 99.9% by weight purity is obtained as crystals from the second and third stage and is again distilled in order to improve the colour number.

EXAMPLE 1

357.5 parts by weight of a catalyst base composition containing 38.5 % by weight of nickel, 7.5 % by weight of chromium, 1.8 % by weight of aluminium and 0.4 % by weight of copper, which has been obtained in a manner which is in itself known by precipitating a carbonate-hydroxide mixture, containing the elements nickel, aluminium and copper, from an aqueous solution of the corresponding nitrates by means of sodium carbonate solution and subsequently reacting the previously washed precipitate with ammonium bichromate solution, are suspended in a solution of 8.1 parts by weight of potassium sulphate in 330 parts by volume of water. Thereafter the contact catalyst sludge obtained is dried at 120°C, ground, mixed with 3 % of graphite and formed into 2.4 mm tablets on an eccentric press.

The tablets are treated with 100 parts by volume of hydrogen per part by weight of tablets and per hour, for 2 ½ hours at 390°C.

A part of the tablets which have been reduced is warmed to 100°C in a stream of $CO_2$ for 30 hours:

| Catalyst A: | bulk density: | 1.36 g/ml |
| --- | --- | --- |
| | specific surface area: | 130 m$^2$/g |
| | Ni(metallic): | 8.6% Ni(total):49.5% |

A further part of the reduced tablets is stored for 3 weeks and then treated with 760 parts by volume of hydrogen per part by weight of tablets and per hour for 2 ½ hours at 390°C, and subsequently warmed to 100°C in a stream of $CO_2$ for 30 hours:

| Catalyst B: | bulk density: | 1.30 g/ml |
| --- | --- | --- |
| | specific surface area: | 130 m$^2$/g |
| | Ni(metallic): | 13.7%, Ni(total): 51.7 % |

In this example and the subsequent examples the relationship of parts by weight to parts by volume is as of g to ml.

EXAMPLE 2

357.5 parts by weight of a catalyst base composition containing 38.2 % by weight of nickel, 8.9 % by weight of chromium, 3.2 % by weight of aluminium and 0.2 % by weight of copper are suspended in a solution of 9.4 parts by weight of potassium sulphate in 330 parts by weight of water. Thereafter, the catalyst suspension is dried at 120°C, and after grinding the product is shaped into 2.4 mm tablets in the usual manner.

The tablets thus obtained are treated with 100 parts by volume of hydrogen per part by weight of tablets and per hour for 2.5 hours at 390°C.

A part of the partially reduced tablets is warmed to 100°C in a stream of $CO_2$ for 30 hours:

| Catalyst C: | bulk density: | 1.31 g/ml |
| --- | --- | --- |
| | specific surface area: | 120 m$^2$/g |
| | Ni(metallic): | 4.6%, Ni(total): 47.2 % |

A further part of the partially reduced tablets is stored for 3 weeks, then treated with 760 parts by volume of hydrogen per part by weight of tablets and per hour for 2.5 hours at 390°C, and thereafter annealed at 100°C in a stream of $CO_2$ for 30 hours:

| Catalyst D: | bulk density: | 1.28 g/ml |
| --- | --- | --- |
| | specific surface area: | 115 m$^2$/g |
| | Ni(metallic): | 12.1%, Ni(total): 49.4% |

EXAMPLE 3

12.870 parts by weight of the catalyst base composition of Example 2 are stirred with a solution of 337.5 parts by weight of potassium sulphate in 11,700 parts by weight of water and the mixture is dried and ground.

A part of this catalyst composition is mixed with 1.5% of graphite and shaped under relatively slight press pressure to give 5 mm tablets. The tablets are treated with 100 parts by volume of hydrogen per part by weight of catalyst and per hour for 2 ½ hours at 380°C, and are then annealed at 100°C in a stream of $CO_2$ for 30 hours:

Catalyst E: bulk density: 0.84 g/ml
Ni(metallic): 12.6%, Ni(total): 52.4 %

A part of the catalyst E is treated with 1200parts by volume of hydrogen per part by weight of catalyst E and per hour for a further 2.5 hours at 390°C:

Catalyst F: bulk density: 0.85 g/ml
Ni(metallic): 26.2 %, Ni(total): 52.7 %

A further part of the catalyst composition is mixed with 1.5 % of graphite and shaped into 5 mm tablets under moderate press pressure. The tablets are first treated with 100 parts by volume of hydrogen per part by weight of catalyst and per hour for 2 ½ hours at 390°C and subsequently treated with 725 parts by volume of hydrogen per part by weight of catalyst and per hour for 2.5 hours at 390°C, and are then annealed in a stream of $CO_2$ at 100°C for 30 hours:

Catalyst G: bulk density: 0,90 g/ml
Ni(metallic): 24.8 %, Ni(total): 52.4 %

Another part of the catalyst composition is processed as in the case of the manufacture of the catalyst G, with the only difference that after the first part of the reduction the tablets are successively treated with $NH_3$ and $CO_2$ at room temperature, then ground and again tabletted with 3 % of graphite under moderate press pressure.

Catalyst H: bulk density: 0.94 g/ml
Ni(metallic): 27.4 %, Ni(total): 51.2 %

Two further parts of the catalyst composition are processed as in the manufacture of the catalyst H, except for the difference that the second tabletting takes place under progressively higher press pressure:

Catalyst I: bulk density: 1.14 g/ml
Ni(metallic): 22.4 %, Ni(total): 49.5 %
Catalyst K: bulk density: 1.20 g/ml
Ni(metallic): 26.6 %, Ni(total): 51.6%

A further part of the catalyst composition is processed as in the manufacture of the catalyst I, with the only difference that instead of $NH_3$ and $CO_2$ a mixture of 2 % by volume of air and 98 % by volume of $CO_2$ is used for the immunisation of the catalyst:

Catalyst L: bulk density: 1.12 g/ml
Ni(metallic): 22.0 %, (total): 49.9%

A further part of the catalyst composition is processed as in the manufacture of the catalyst I, with the only difference that instead of the final ageing with $CO_2$ at 100°C, a 12 hour treatment with a mixture of 2 % by volume of air and 98 % by volume of $CO_2$ at room temperature is carried out:

Catalyst M: bulk density: 1.12 g/ml
Ni(metallic): 21.5 % Ni(total): 50.1 %

A further part of the catalyst composition is processed as in the manufacture of the catalyst I, with the only difference that the second part of the reduction takes place at 370°:

Catalyst N: bulk density: 1.10 g/ml
Ni(metallic): 19.2 %, Ni(total): 49.4 %

EXAMPLE 4

6.0 parts by weight of a mixture of 97 parts by weight of 2-cyclohexenylcyclohexanone and 2-cyclohexylidenecyclohexanone, 2.5 parts by weight of 2-cyclohexylcyclohexanone and 0.5 parts by weight of cyclohexanone are metered hourly into a tubular reactor of tube diameter 17 mm, of which the upper part is used as an evaporation zone and the lower part is filled with 30 parts by volume of the catalyst B manufactured according to Example 1. The catalyst temperature is kept at 330°C.

After a start-up period of a few hours, b 5.7 parts by weight of reaction product, consisting of 83% of 2-hydroxydiphenyl, 7% of 2-cyclohexylphenol, 3.5% of diphenyl, 6% of diphenylene oxide and 0.5 % of phenol is obtained hourly; taking into account the re-usable cyclohexylphenol component, this corresponds to a selectivity of 90.5%.

After an operating time of 1500 hours the reaction mixture consists of 66 % of 2-hydroxydiphenyl, 24% of 2-cyclohexylphenol, 4% of 2-cyclohexylcyclohexanone, 3.5% of diphenylene oxide, 1% of diphenyl and 0.5% of phenol; this corresponds to a selectivity of 94.5%.

If instead of the catalyst B the catalyst A manufactured according to Example 1 is employed and the above procedure is followed, the reaction mixture contains 81% of 2-hydroxydiphenyl, 6% of 2-cyclohexylphenol, 7% of diphenylene oxide, 4 % of diphenyl, 0.5% of phenol and 1.5% of lowerboiling intermediate products at the beginning of the experiment.

After an operating time of only 320 hours, the 2-hydroxydiphenyl content in the reaction mixture has dropped to 53%. Furthermore, 26% of 2-cyclohexylphenol, 8% of diphenylene, oxide, 6% of 2-cyclohexylcyclohexanone, 2% of diphenyl, 2% of cyclohexenylcyclohexanone, 0.6% of phenylcyclohexanone, 0.6% of phenol and 1.8% of lower-boiling byproducts are produced.

EXAMPLE 5

6.0 parts by weight of the starting product used in Example 4, in the vapour form, are passed hourly over 30 parts by volume of the catalyst D, manufactured according to Example 2, in a tubular reactor (tube internal diameter: 17 mm), whilst maintaining a contact catalyst temperature of 330°C.

After a short start-up time, the reaction product obtained is approx. 5.7 parts by weight hourly of a mixture which consists of 85% of 2-hydroxydiphenyl, 5% of 2-cyclohexylphenol, 0.5% of 2-cyclohexylcyclohexanone, 5.5% of diphenylene oxide, 3.5% of diphenyl and 0.5% of phenol; taking into account the reusable compounds, this corresponds to a selectivity of 91%.

After an operating time of 1450 hours, the reaction mixture has the following composition: 65% of 2-hydroxydiphenyl, 20% of 2-cyclohexylphenol, 5% of 2-cyclohexylcyclohexanone, 1.3% of 2-cyclohexenylcyclohexanone and 2-cyclohexylcyclohexanol, 6% of diphenylene oxide, 2% of diphenyl, 0.5% of phenol and 0.7% of lower-boiling intermediate products; taking into account the reusable compounds, this corresponds to a selectivity of 92%.

In order to rinse the catalyst, the oven temperature is dropped to 200C. Thereafter, 100 parts by weight of the mixture used as the starting product, in the liquid form, are pumped hourly for 2 hours over the catalyst. The oven is then heated to 330°C in a stream of nitrogen and again used for the dehydrogenation.

The dehydrogenation mixture obtained constists of 72% of 2-hydroxydiphenyl, 17% of 2-cyclohexylphenol, 3.0 % of 2-cyclohexylcyclohexanone, 0.8% of 2-cyclohexenylcyclohexanone and 2-cyclohexylcyclohexanol, 4.6% of diphenylene oxide, 1.6% of diphenyl and 1.0 % of phenol and lower-boiling intermediate products.

After a total operating time of 2700 hours, the 2-hydroxydiphenyl content in the reaction mixture has dropped to 60%. A further rinsing is carried out. For this, the oven temperature is lowered to 170°C and 100 parts by weight of liquid phenol are pumped hourly for 6 hours over the catalyst. Thereafter, the oven is again heated to 330°C in a stream of nitrogen and again started up. The 2-hydroxydiphenyl content in the reaction mixture has risen to 70 % as a result of the rinsing process.

After an operating time of 3300 hours, a renewed rinsing with phenol is carried out, and as a result, if the contact temperature is simultaneously raised to 350°C, the 2-hydroxydiphenyl content in the reaction product rises from 60% to 78%.

After an operating time of 4100 hours the 2-hydroxydiphenyl content has merely again dropped to 68% under these conditions.

If, instead of the catalyst D, the catalyst C manufactured according to Example 2 is employed, and the procedure described at the beginning of the example is followed, the 2-hydroxydiphenyl content in the reaction mixture already declines from 81% to 58% in the first 160 operating hours. The content of by-products which cannot be re-used is 11 to 12% during this time.

EXAMPLE 6

6.0 parts by weight of the starting product used in Example 4, in the vapour form, are passed hourly over 30 parts by volume of one of the catalysts manufactured according to Example 3, in a tubular reactor (tube internal diameter: 17 mm) at a catalyst temperature of 330°C. The following results are obtained:

| Catalyst | Operating hour | Reaction products | | Selectivity (%) |
|---|---|---|---|---|
| | | 2-hydroxy-diphenyl (%) | -usable compound (%)* | |
| E | 11th | 84 | 11 | 94 |
|   | 280th | 55 | 35 | 85 |
| F | 57th | 81 | 12 | 92 |
|   | 280th | 62 | 30 | 89 |
| G | 33rd | 82 | 11 | 92 |
|   | 280th | 66 | 26 | 89 |
| H | 80th | 82 | 10 | 91 |
|   | 800th | 67 | 27 | 92 |
| I | 70th | 84 | 7 | 90 |
|   | 800th | 66 | 28 | 92 |
| L | 75th | 83 | 9 | 92 |
|   | 800th | 66 | 27 | 90 |
| M | 60th | 82 | 9 | 90 |
|   | 800th | 65 | 28 | 90 |
| N | 60th | 82 | 9 | 90 |
|   | 800th | 65 | 28 | 90 |

*This group includes the following compounds: 2-cyclohexylphenol, 2-phenylcyclohexanone, 2-phenylcyclohexanol, 2-cyclohexenylcyclohexanone, 2-cyclohexylidenecyclohexanone, 2-cyclohexylcyclohexanone and 2-cyclohexylcyclohexanol.

EXAMPLE 7

1800 parts by weight of a mixture which consists of 99.2% of 2-cyclohexenylcyclohexanone and 2-cyclohexylidenecyclohexanone and 0.8 % of cyclohexanone and cyclohexanol, in the vapour phase, are passed hourly over 7000 parts by volume of the catalyst K manufactured according to Example 3, in a tubular reactor of 400 cm length and tube diameter 50 mm, at a catalyst temperature of 330° to 340°C. The following results are obtained:

| Operating hour | 2-Hydroxydiphenyl (%) | Reaction product | | |
|---|---|---|---|---|
| | | Intermediate products (cyclohexanol, cyclohexanone, phenol and the like) (%) | Diphenyl and diphenylene oxide (%) | Reusable compound, see Example 6 (%) |
| 180th | 88 | 1 | 8 | 3 |
| 500th | 86 | 1 | 7 | 6 |
| 720th | 85 | 1 | 9 | 5 |
| 1000th | 84 | 1 | 8 | 7 |
| 1400th | 83 | 1 | 8 | 8 |
| 1600th | 82 | 1 | 8 | 9 |
| 2400th | 70 | 1 | 8 | 21 |

EXAMPLE 8

6.0 parts by weight of the starting product used in Example 4, in the vapour form, are passed hourly over 30 parts by volume of a catalyst manufactured according to Example 1 of U.S. Patent No. 2,640,084, in a tubular reactor (tube diameter; 17 mm) at a catalyst temperature of 330°C. The following result is obtained:

| Operating hour | 2-Hydroxydiphenyl (%) | Reaction products | | Reusable compound (%) | Selectivity (%) |
| --- | --- | --- | --- | --- | --- |
| | | Intermediate products (cyclohexanol, cyclohexanone, phenol and the like) (%) | Diphenyl and diphenylene oxide (%) | | |
| 1st–16th | 51 | 19 | 14 | 16 | 61 |
| 17th–40th | 30 | 18 | 11 | 41 | 51 |

EXAMPLE 9

The purification of the product arising in the gas phase dehydrogenation is explained as follows, in relation to the flow diagram (the amounts quoted are in kg/hour)

In the dehydrogenation reactor 1, a mixture is obtained, for example from dianone, by catalytic dehydrogenation, for example on the catalyst K prepared according to Example 3; in addition to hydrogen, this mixture contains 0,5 kg of low-boiling consituents such as cyclohexane, benzene, cyclohexanone, phenylcyclohexane and others, 0.37 kg of phenol, 1,37 kg of diphenyl, 4,24 kg of diphenylene oxide, 31.5 kg of 2-hydroxydiphenyl, 3.0 kg of 2-cyclohexylphenol and 0.4 kg of further byproducts. In the distillation apparatus 3, the low-boiling constituents, phenol, diphenyl, a part of the diphenylene oxide and a part of further byproducts, present in minor amounts, are distilled from the mixtures from the dehydrogenation reactors 1 and 2, so that the material introduced into the crystallisation stage (apparatus 4) together with the mother liquor of the second crystallisation stage (apparatus 5) consists of 8.8 kg of a diphenylene oxide, 88 kg of 2-hydroxydiphenyl, 9.8 kg of 2-cyclohexylphenol and 5.0 of further byproducts. In the tube-bundle crystallisation apparatus, 4, a total of 44.2 kg of mother liquor is obtained, containing 5.8 kg of diphenylene oxide, 28.6 kg of 2-hydroxydiphenyl, 6.6 kg of 2-cyclohexylphenol and 3.2 kg of further by-products, together with a total of 67.4 kg of crystals containing 3.0 kg of diphenylene oxide, 59.4 kg of 2-hydroxydiphenyl, 3.2 kg of 2-cyclohexylphenol and 1.8 kg of other products. Whilst the mother liquor is again dehydrogenated in the apparatus 2 and is passed to the distillation 3, the crystals together with the mother liquor of the third crystallisation stage are again crystallised from the melt in apparatus 5. Here, 33.8 kg of mother liquor, consisting of 3.0 kg of diphenylene oxide, 25.6 kg of 2-hydroxydiphenyl, 3.2 kg of 2-cyclohexylphenol and 2.0 kg of further products, 81 kg of crystals consisting of 1.6 kg of diphenylene oxide, 77.5 kg of 2-hydroxydiphenyl, 1.4 kg of 2-cyclohexylphenol and 0.5 kg of further products, and a pure fraction of 10.6 kg of 2-hydroxydiphenyl, are obtained. The crystal fraction is finally again purified in apparatus 6. 57.8 kg of mother liquor containing 1.6 kg of diphenylene oxide, 54.5 kg of 2-hydroxydiphenyl, 1.3 kg of 2-cyclohexylphenol and 0.6 kg of further products, and 23.2 kg of a pure fraction of 2-hydroxydiphenyl, are obtained. The combined pure fraction from the crystallisation apparatuses 5 and 6 can finally again be distilled to improve the colour number.

EXAMPLE 10 a. Separation of diphenyl from the dehydrogenation mixture by fractional distillation.

40.3 kg/hour of dehydrogenation mixture from dianone are continuously passed to a distillation column with 30 theoretical plates. The dehydrogenation mixture contains, on average, 74 % of 2-hydroxydiphenyl, 20 % of diphenylene oxide and 2-cyclohexylphenol and 6 % of lower-boiling constituents such as diphenyl, phenol, phenylcyclohexane, cyclohexane and cyclohexanol. Using a reflux ratio of 1 : 30, the distillation column yields a product at the head which contains the lower-boiling constituents of the dehydrogenation mixture in addition to a few per cent of diphenylene oxide and o-hydroxydiphenyl 2.6 kg/hour in total. 37.7 kg/hour, containing on average 81% by weight of 2-hydroxydiphenyl, are obtained as the sump product, wherein the diphenyl content is less than 0.01% by weight.

b. Purification of the diphenyl-free, crude o-hydroxydiphenyl by crystallisation.

Recrystallisation from aliphatic or aromatic hydrocarbons: 1 kg of the 80% strength by weight 2-hydroxydiphenyl is dissolved in 400 ml of petroleum ether (boilint point 40° – 60°C), with warming, in a 5 liter stirred kettle with double jacket and anchor stirrer. On cooling with water at 15°C with very vigorous stirring, 560 g of 0.1 to 0.3 mm long crystals, wherein the 2-hydroxydiphenyl content is 99% by weight, separate out over the course of 1 hour.

EXAMPLE 11

17,160 g of a catalyst base composition containing 43.6 per cent by weight of nickel, 9.4 per cent by weight of chromium, 3.0 per cent by weight of aluminium and 0.2 per cent by weight of copper, which was obtained in a manner which is in itself known by precipitation of a carbonate-hydroxide mixture, containing the elements nickel, aluminium and copper, from an aqueous solution of the corresponding nitrates by means of sodium carbonate solution and subsequent reaction of the previously washed precipitate with ammonium bichromate solution, are suspended in a solution of 450 g of potassium sulphate in 15.800 ml of water. The contact catalyst paste thus obtained is dried at 120°C, ground, mixed with 3 % of graphite and pressed into 5 mm tablets.

18.200 g of the tablets thus obtained are filled into a vertical tubular furnace (diameter: 15 cm). The furnace is heated to 370°C and is then kept for 3 hours at 370°C whilst hourly passing 1.820 l of hydrogen and 1.820 l of nitrogen through the loosely packed catalyst. The temperature in the loosely packed catalyst is between 350° and 420°C for 2.5 hours.

After cooling, the catalyst is treated for 24 hours with a mixture of 40 l of air and 2000 l of nitrogen per hour.

Bulk density: 1.02 g/ml, Ni(metallic): 13.2 %

The catalyst is then ground, mixed with 2 % of graphite and again shaped into 5 mm tablets.

13.600 g of the tablets thus obtained are heated in a vertical tubular furnace of 15 cm diameter, whilst passing 6.800 l of hydrogen per hour through them, in such a way that the temperature in the loosely packed catalyst is between 360 and 395°C for 3 hours. Thereafter the catalyst is treated with carbon dioxide for 30 hours at 100°C.

Bulk density: 1.14 g/ml
Specific surface area: 117 m²/g
Ni(metallic): 40.5 %, Ni(total): 54.3%.

EXAMPLE 12

6.0 g of a mixture of 2-cyclohexenylcyclohexanone and 2-cyclohexylidenecyclohexanone are metered hourly at 330°C into a tubular reactor having a tube diameter of 17 mm and filled with 30 ml of the catalyst manufactured according to Example 11. After a start-up period of a few hours, 5.7 g of reaction product are obtained hourly, containing 83 per cent by weight of 2-hydroxydiphenyl, 6.3 per cent by weight of 2-cyclohexylphenol, 2-cyclohexylcyclohexanone and starting product, 6.8 per cent by weight of diphenylene oxide, 3.1 per cent by weight of diphenyl and 0.8 per cent by weight of mononuclear decomposition products. After a running time of 2.000 hours the reaction product consists of 66.5 per cent by weight of 2-hydroxydiphenyl, 23.5 per cent by weight of 2-cyclohexylphenol, 2-cyclohexylcyclohexanone and other reusable compounds, and 6 per cent by weight of diphenylene oxide, 2.1 per cent by weight of diphenyl nd 1.9 per cent by weight of mononuclear decomposition products.

We claim:

1. A process for manufacturing a catalyst which comprises the steps of
   a. preparing a catalyst base composition by
      I. treating an aqueous solution containing a nickel salt, a chromium salt, an aluminum salt and a copper salt with an aqueous solution of a precipitant selected from the group consisting of sodium hydroxide, ammonia, alkali metal carbonate and alkali metal bicarbonate or
      II. precipitating an aqueous solution containing a nickel salt, an aluminum salt and a copper salt with an alkali metal carbonate and reacting the precipitated carbonate-hydroxide mixture, after washing, with ammonium bichromate at elevated temperature,
   whereby the amounts are selected to give a nickel metal to chromium metal to aluminum metal to copper metal weight ratio of 40–60 to 6.8–17.1 to 1.6–8.0 to 0.05–1.0;
   b. impregnating said catalyst base composition with at least one member selected from the group consisting of alkali metal sulfate and alkali metal carbonate to obtain an alkali metal to nickel metal weight ratio of 0.65–3.4 to 40–60;
   c. shaping said catalyst base composition either before or after said impregnation into a molding having a bulk density of 0.8–1.6 g/ml;
   d. reducing impregnated catalyst molding at a temperature between 350° and 420°C. for about 1 to 4 hours with about one-half to twice the equivalent amount of hydrogen calculated for reducing nickel compounds present to metallic nickel and any chromium VI compounds present to trivalent chromium and
   e. subsequently further reducing said moldings, at a temperature between 350° and 420°C. for about 1 to 4 hours, with with 2 to 10 times the equivalent amount of hydrogen for reducing nickel compounds present to metallic nickel until the metallic nickel content of the composition is 10–45% by weight.

2. The process of claim 1 wherein the alkali metal to nickel metal ratio is 0.95–2.8 to 40–60.

3. The process of claim 1 wherein said bulk density is 0.9–1.4 g/ml.

4. The process of claim 1 wherein the time interval between steps (d) and (e) is at least one week.

5. The process of claim 1 wherein the reduction of step (e) is carried out until the metallic nickel content in the composition is 35–42% by weight.

6. The catalyst produced by the process of claim 1.

7. The catalyst of claim 6 wherein the reduction of step e) is carried out until the metallic nickel content in the composition is 35–42% by weight.

* * * * *